US010343522B2

(12) United States Patent
Choi et al.

(10) Patent No.: US 10,343,522 B2
(45) Date of Patent: Jul. 9, 2019

(54) CENTRAL CONTROL PANEL FOR VEHICLES AND METHOD OF CONTROLLING SAME

(71) Applicants: Hyundai Motor Company, Seoul (KR); Kia Motors Corporation, Seoul (KR)

(72) Inventors: Young Rok Choi, Gyeonggi-do (KR); Eup Jung Choi, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/828,929

(22) Filed: Dec. 1, 2017

(65) Prior Publication Data

US 2019/0077261 A1 Mar. 14, 2019

(30) Foreign Application Priority Data

Sep. 13, 2017 (KR) .......................... 10-2017-0116932

(51) Int. Cl.
*H05B 1/02* (2006.01)
*B60K 35/00* (2006.01)
*B60K 37/02* (2006.01)
*G06F 3/0488* (2013.01)
*B60H 1/22* (2006.01)
*B60W 50/14* (2012.01)

(52) U.S. Cl.
CPC .............. *B60K 35/00* (2013.01); *B60K 37/02* (2013.01); *G06F 3/0488* (2013.01); *B60H 1/2215* (2013.01); *B60W 2050/146* (2013.01)

(58) Field of Classification Search
CPC ....... B60K 35/00; B60K 37/02; G06F 3/0488; B60H 1/2215; H05B 1/0236; H05B 1/02; H05B 3/0042
USPC .................................. 219/202, 494, 497, 506
See application file for complete search history.

(56) References Cited

U.S. PATENT DOCUMENTS

| 5,856,822 A * | 1/1999 | Du ....................... G06F 3/03547 345/157 |
| 5,963,890 A * | 10/1999 | Sarbach ............. B60H 1/00978 219/202 |
| 10,144,290 B2 * | 12/2018 | Jang ........................ B60K 37/06 |
| 2015/0288362 A1 | 10/2015 | Lee |

FOREIGN PATENT DOCUMENTS

| JP | 2011-000914 A | 1/2011 |
| KR | 10-2012-0115643 | 10/2012 |
| KR | 10-1458453 B1 | 11/2014 |
| KR | 10-2016-0024068 | 3/2016 |

* cited by examiner

*Primary Examiner* — Mark H Paschall
(74) *Attorney, Agent, or Firm* — Mintz Levin Cohn Ferris Glovsky and Popeo, P.C.; Peter F. Corless (57) ABSTRACT

A central control panel for vehicles and a method of controlling the same are provided. The central control panel for vehicles includes a touch pad, a PCB disposed under the touch pad and a lighting unit that is mounted on the PCB and includes a plurality of LEDs. An outdoor air temperature sensor senses an outdoor air temperature of a vehicle and a controller adjusts a temperature of the touch pad by changing a temperature of the lighting unit based on the sensed outdoor air temperature. The central control panel for vehicles further includes a top ring that transmits light emitted from the LEDs to the outside and to surround a perimeter of the touch pad.

11 Claims, 6 Drawing Sheets

| CATEGORIZATION | OFF | PWM 10% | PWM 25% | PWM 50% | PWM 70% | PWM 90% | PWM 100% |
|---|---|---|---|---|---|---|---|
| OUTDOOR AIR TEMPERATURE (℃) | 0 | -1 | -2 | -3 | -4 | -5 | -6 OR BELOW |
| DIAL SURFACE COVER TEMPERATURE (℃) | - | 27 | 28 | 29 | 30 | 32 | 33 |

CENTRAL CONTROL PANEL FOR VEHICLES AND METHOD OF CONTROLLING SAME

CROSS-REFERENCE TO RELATED APPLICATION(S)

This application claims the benefit of Korean Patent Application No. 10-2017-0116932, filed on Sep. 13, 2017, which is hereby incorporated by reference as if fully set forth herein.

BACKGROUND

Field of the Invention

The present invention relates to a vehicle, and more particularly, to technology of controlling a temperature of a central control panel, which is one of audio, video and navigation (AVN) input devices, according to external surroundings of a vehicle.

Discussion of the Related Art

In general, an audio, video and navigation (AVN) system for vehicles is a multimedia system into which an audio unit, a video unit, a navigation system, a telematics terminal, etc. are integrated. The AVN system is referred to as a head unit and may perform both output and control multimedia, such as audio, video, navigation, etc., through an AVN display installed on a dash board within a vehicle, such as an instrument panel or a center fascia.

As another type of control device of the AVN system, a central control panel (CCP) may be mounted on a center console to allow a driver to more conveniently operate the central control panel. The central control panel is referred as a driver information system (DIS) switch and may operate various devices such as windows, seats, doors, an air conditioner, etc., in addition to the AVN system.

The central control panel includes a dial and buttons disposed around the dial, and may protrude from the surface of the center console. A driver may control the AVN system by touching the surface of the central control panel, inputting handwritten characters, or rotating the central control panel. The interior temperature of the vehicle is decreased in winter or in cold weather and, when a driver operates the central control panel by hand to control the AVN system, the driver may experience cold and thus feel inconvenience during operation.

SUMMARY

Accordingly, the present invention is directed to a central control panel for vehicles and a method of controlling the same that substantially obviate one or more problems due to limitations and disadvantages of the related art. An object of the present invention is to provide a central control panel for vehicles, a surface temperature of which may be increased when a vehicle is parked at the outside in winter or in colder weather, to allow a driver to conveniently operate an AVN system, and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a central control panel for vehicles may include a touch pad, a printed circuit board (PCB) disposed under the touch pad, a lighting unit mounted on the PCB and including a plurality of light emitting diodes (LEDs), an outdoor air temperature sensor configured to sense an outdoor air temperature of a vehicle, and a controller configured to adjust a temperature of the touch pad by changing a temperature of the lighting unit based on the outdoor air temperature sensed by the outdoor air temperature sensor.

The controller may further be configured to adjust the temperature of the touch pad by adjusting the temperature of the lighting unit by providing a pulse width modulation (PWM) driving signal to the LEDs and adjusting a duty cycle of the PWM driving signal. The central control panel for vehicles may further include a top ring configured to transmit light emitted from the LEDs to the outside and to surround a perimeter of the touch pad. The LEDs may be spaced apart from each other along an outer circumference of the PCB.

The controller may be configured to operate the LEDs to emit light in different colors based on surface temperatures of the touch pad. The controller may further be configured to operate the LEDs to emit light in different colors in a general lighting mode and in a temperature increase mode. The central control panel for vehicles may further include a power supply unit configured to supply power to the lighting unit and a switch unit installed between the controller and the lighting unit, and the switch unit may be configured to adjust an intensity of current supplied to the lighting unit or a light emitting time of the LEDs based on a control signal from the controller.

Further, the controller may be configured to adjust the temperature of the touch pad based on a change in the outdoor air temperature of the vehicle during pre-booting of the AVN system. The controller may be configured to adjust the duty cycle of the PWM driving signal to increase the surface temperature of the touch pad by about 1° C. from a reference temperature whenever the outdoor air temperature is decreased by about −1° C. Adjustment of the temperature of the touch pad may be performed for about 3 minutes, for which pre-booting of the AVN system is performed, and, when an engine of the vehicle is not started or the air conditioner is not operated within 3 minutes, for which pre-booting of the AVN system is performed, adjustment of the temperature of the touch pad may be stopped. When the air conditioner is operated within about 3 minutes, for which pre-booting of the AVN system is performed, adjustment of the temperature of the touch pad may be performed for about 10 minutes.

In another aspect of the present invention, a method of controlling a central control panel may include unlocking a door lock, pre-booting an AVN system of a vehicle and measuring an outdoor air temperature, when the measured outdoor air temperature is a designated temperature or less, increasing a temperature of the touch pad by changing a temperature of the lighting unit by providing a pulse width modulation (PWM) driving signal to LEDs of the central control panel and adjusting a duty cycle of the PWM driving signal, and executing a temperature increase mode to indicate change in the temperature of the touch pad as change in color of light from the lighting unit.

The designated temperature may be about −1° C. When the temperature of the lighting unit is increased, light from the lighting unit may be changed from a basic color to a color that indicates an increase in the temperature of the lighting unit. The method may further include determining whether an air conditioner is operated within about 3 minutes, for which pre-booting of the AVN system is performed.

When the air conditioner is not operated within 3 minutes, for which pre-booting of the AVN system is performed, the lighting unit may be turned off. When the air conditioner is operated within 3 minutes, for which pre-booting of the AVN system is performed, turning-on conditions of the lighting unit may be determined after a designated period of time. The designated time may be about 10 minutes, and heating of the lighting unit may be stopped after the designated time.

As a result of determining the turning-on conditions of the lighting unit, when turning-on of the lighting unit is necessary, the color of light from the lighting unit may be changed to a basic color. In addition, as a result of determining the turning-on conditions of the lighting unit, when turning-on of the lighting unit is unnecessary, the lighting unit may be turned off. The duty cycle of the PWM driving signal may be adjusted to increase the surface temperature of the touch pad by about 1° C. from a reference temperature whenever the outdoor air temperature is decreased by about −1° C.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. In the drawings, for convenience and clarity of description, elements may be exaggerated, omitted or schematically illustrated. Further, sizes of the respective elements may not represent real sizes of the elements. In addition, the same or similar elements are denoted by the same reference numerals even though they are depicted in different drawings.

Figure 1:
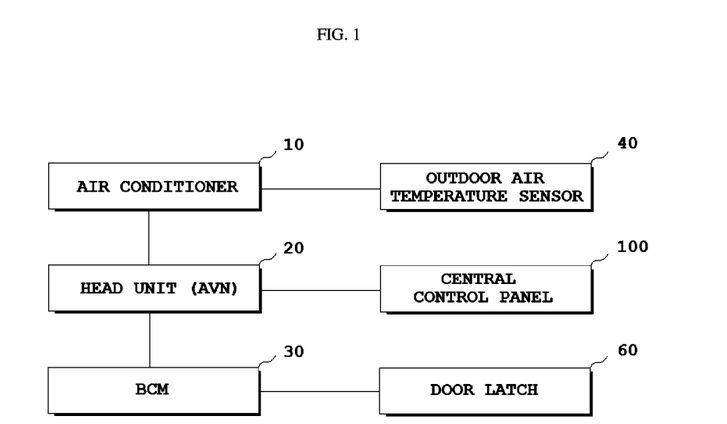
FIG. 1 is a block diagram illustrating a central control panel for vehicles in accordance with an exemplary embodiment of the present invention and related systems installed therearound.

FIG. 1 is a block diagram illustrating a central control panel for vehicles in accordance with the present invention and related systems installed therearound. As exemplarily shown in FIG. 1, the vehicle may include an air conditioner 10 may be configured to adjust an indoor temperature of a vehicle during cooling or heating, an audio, video and navigation (AVN) system 20 may be referred to as a head unit, and a body control module (BCM) 30 may be configured to operate systems within the vehicle.

In particular, the air conditioner 10 may be configured to receive outdoor air temperature information from an outdoor air temperature sensor 40 and perform operation necessary for air conditioning. For example, the outdoor air temperature sensor 40 is a sensor configured to sense a change in the outdoor air temperature through a change in resistance of a thermistor, and the outdoor air temperature sensor 40 may be installed in various locations, such as a central part of a front panel, the inside of a lower part of a front bumper, the inside of a bonnet, a side mirror, etc. As needed, the outdoor air temperature sensor 40 may include a temperature sensor configured to sense an indoor or outdoor air temperature of the vehicle.

Further, the AVN system 20 may be configured to receive a command through an AVN display or the central control panel 100 and operate multimedia functions, such as audio, video and navigation functions, and also execute operations of various devices, such as windows, seats, door, the air conditioner 10, etc. The BCM 30 is a central controller in which many electronic control units (ECUs) in the vehicle are integrated. For example, the BCM 30 may interconnect a door latch 60 and the AVN system 20 and thus may be configured to operate the AVN system 20 to performing pre-booting when the door latch 60 is opened (a door is opened).

Figure 2:
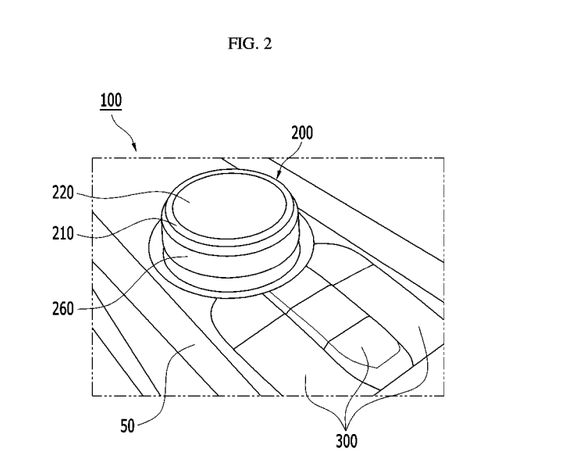
FIG. 2 is a perspective view of a central control panel in accordance with one exemplary embodiment of the present invention.

FIG. 2 is a perspective view of a central control panel in accordance with one exemplary embodiment of the present invention. As exemplarily shown in FIG. 2, the central control panel 100 may operate as an input device of the AVN system 20 to allow a driver to more conveniently input a command to the AVN system 20. For example, the central control panel 100 may be mounted on a central console 50 forming the border between a driver seat and a passenger seat. Of course, the central control panel 100 may be mounted at other positions of the vehicle than the center console 50.

The central control panel 100 may generally include a dial unit 200 and a button unit 300 disposed around the dial unit 200. A driver may operate the AVN system 20 by touching a touch pad 220 of the dial unit 200, inputting handwritten characters or turning a rotatable body 260 of the dial unit 200. The dial unit 200 may protrude from the surface of the center console 50 or, as needed, the dial unit 200 may be depressed from the surface of the center console 50 or be coplanar with the surface of the center console 50.

Figure 3:
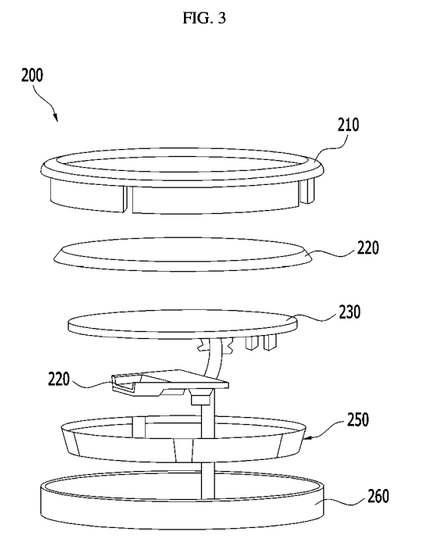
FIG. 3 is perspective detailed view of a dial unit of FIG. 2 in accordance with one exemplary embodiment of the present invention.
Figure 4:
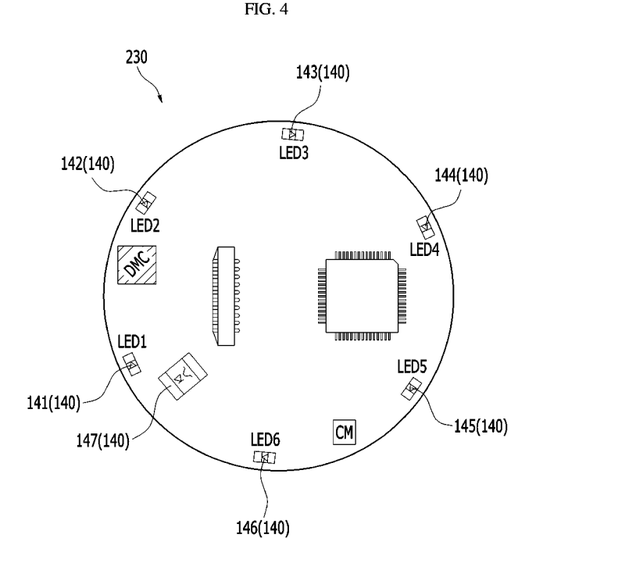
FIG. 4 is a schematic plan view of a PCB of FIG. 3 in accordance with one exemplary embodiment of the present invention.

FIG. 3 is a detailed view of the dial unit of FIG. 2, and FIG. 4 is a schematic plan view of a PCB of FIG. 3. As exemplarily shown in FIGS. 3 and 4, the dial unit 200 may include a top ring 210, the touch pad 220, a PCB 230, a lighting unit 140, and the rotatable body 260.

In particular, the top ring 210 may form an upper housing of the dial unit 200, have a shape of surrounding the perimeter of the touch pad 220 and be disposed at an upper part of the dial unit 200. Additionally, the top ring 210 may be formed of a material which may transmit light emitted from LEDs 141 to 147 mounted on the PCB 230, which will be described later, to the outside of the vehicle. The touch pad 220 may be operable by a finger, a pen, etc. to receive a control command. For example, the touch pad 220 may be a pointing display device, such as a mouse pointer including a plate-type sensor. Therefore, when a driver contacts the touch pad 220 using a finger or a pen, the touch pad 220 detects pressure, a pointer on a screen moves, and the AVN system 20 may be configured to recognize position information of the pointer and thus receive a command. The touch pad 220 may be referred as a surface cover.

The PCB 230 may include various chips in which programs relating to control of the central control panel 100, such as calculation according to input through the touch pad 220, may be stored. The PCB 230 may have a circular shape that corresponds to the shape of the touch pad 220, as exemplarily shown in FIG. 4. The lighting unit 140 may be installed on the PCB 230. The lighting unit 140 may include a plurality of LEDs 141 to 147. The lighting unit 140 may be turned on in a specific color (e.g., blue) to allow a driver to identify the position of the dial unit 200 or an input command (in a general lighting mode).

The LEDs 141 to 147 may be spaced apart from each other along the outer circumference of the PCB 230. For example, as exemplarily shown in FIG. 4, six LEDs 141 to 146 may be spaced apart from each other at regular intervals along the outer circumference of the PCB 230 and, as needed, one LED 147 may be disposed at an inner position of the PCB 230. The above-described number and disposition of the LEDs of the lighting unit 140 are exemplary and may be variously modified, as desired. The PCB 230 and the touch pad 220 may be disposed close to each other (e.g., at an interval of 1 mm). Therefore, a surface temperature of the touch pad 220 may be increased by heating of the lighting unit 230 mounted on the PCB 230.

The rotatable body 260 may include wrinkles or grooves formed on the outer circumferential surface thereof to allow a driver to more easily turn the rotatable body 260 by hand. The rotatable body 260 may be combined with the outer surface of the top ring 210 and may thus be exposed to the outside. In particular, non-described reference numerals 240 and 250 indicate an entering silicone mat and a lighting guide. The central control panel 100 may include other elements in addition to the above-described elements, but illustration and description of elements, which are less related to this embodiment of the present invention, will be omitted. The interior temperature of the vehicle may decrease in winter or in cold weather and, when a driver operates the central control panel 100 by hand to control the AVN system 20, the driver may experience cold and thus feel inconvenience during operation.

Figure 5:
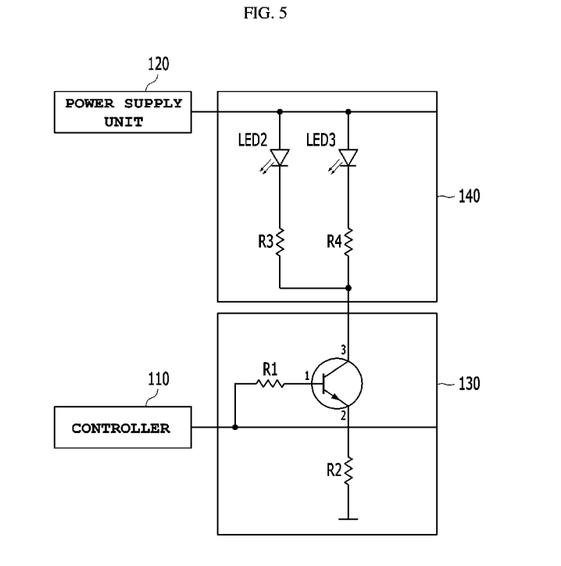
FIG. 5 is a circuit diagram illustrating configuration of an essential portion of the central control panel which enables adjustment of the temperature of a touch pad in accordance with one exemplary embodiment of the present invention.

FIG. 5 is a circuit diagram illustrating configuration of an essential portion of the central control panel which enables adjustment of the temperature of the touch pad. Accordingly, the central control panel 100 in accordance with this exemplary embodiment may further include a controller 110 configured to adjust the surface temperature of the touch pad 220, a power supply unit 120 and a switch unit 130, as exemplarily shown in FIG. 5.

The controller 110 may be configured to change the temperature of the lighting unit 140 by providing a pulse width modulation (PWM) driving signal to the LEDs 141 to 147 and by adjusting a duty cycle of the PWM driving signal, and thus consequently may be configured to adjust the surface temperature of the touch pad 220. In particular, PWM is a modulation method in which the width of a pulse is changed according to an amplitude of a modulation signal, and a desired voltage signal average value may be output using a pulse (a voltage waveform) of a driving signal (a voltage signal). In other words, power output may be adjusted by changing a pulse duty ratio by changing only a pulse width without frequency change.

Furthermore, the lighting unit 140 may be configured to receive power from the power supply unit 120. Although FIG. 5 exemplarily illustrates only the LED2 and LED3 included in the lighting unit 140, the number of LEDs may be modified. The switch unit 130, which is installed between the controller 110 and the lighting unit 140 and includes a transistor TR, may be configured to adjust an intensity of current supplied to the lighting unit 140 or a light emitting time of the LEDs 141 to 147 according to a control signal from the controller 110.

Therefore, the controller 10 together with the switch unit 130 may be configured to adjust the temperature of the touch pad 220 disposed close to or proximate to the upper surface of the PCB 230 by changing the temperature of the lighting unit 140 by adjusting a duty cycle (%) of a PWM driving signal. Adjustment of the temperature of the touch pad 220 may be performed for about 3 minutes, for which pre-booting of the AVN system 20 is performed, after unlocking of a door lock by operating the door latch 60 of the vehicle. When a driver does not start an engine of the vehicle or does not operate the air conditioner 10 within 3 minutes, for which pre-booting of the AVN system 20 is performed, adjustment of the temperature of the touch pad 220 may be stopped to save power of a vehicle battery (e.g., the power supply unit 120). When the driver operates the air conditioner 10 within 3 minutes, for which pre-booting of the AVN system 20 is performed, the touch pad 220 may be heated for about 10 minutes, during which time it may be determined that the interior temperature of the vehicle is increased, and, thereafter, heating of the touch pad 220 may be stopped.

Figure 6:
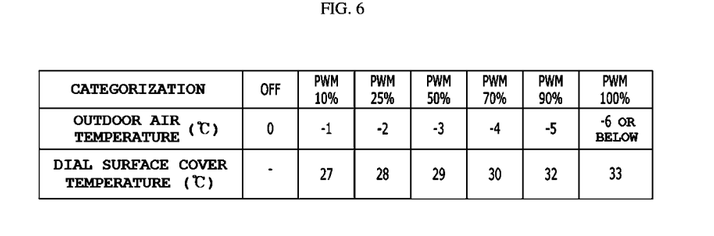
FIG. 6 is a table representing adjustment of the temperature of the touch pad by adjusting a PWM duty cycle according to outdoor air temperature in accordance with one exemplary embodiment of the present invention.

FIG. 6 is a table representing adjustment of the temperature of the touch pad by adjusting a PWM duty cycle according to outdoor air temperature. As exemplarily shown in FIG. 6, adjustment of the temperature of the touch pad 220 may be variously executed based on an outdoor air temperature change. The outdoor air temperature may be measured by the outdoor air temperature sensor 40 interlocked with the above-described air conditioner 10.

For example, when the outdoor air temperature is about 0° C., adjustment of the temperature of the touch pad 220 may not be performed and, when the outdoor air temperature is about −1° C. or below, adjustment of the temperature of the touch pad 220 may be performed through the above-described controller 110. When the outdoor air temperature is about −1° C., the surface temperature of the touch pad 220 may be changed to about 27° C. by adjusting a duty cycle of a PWM driving signal to about 10%. Additionally, when the outdoor air temperature is about −6° C., the surface temperature of the touch pad 220 may be changed to about 33° C. by adjusting the duty cycle of the PWM driving signal to about 100%.

In other words, the duty cycle of the PWM driving signal may be adjusted and thus, whenever the outdoor air temperature is decreased by about −1° C., the surface temperature of the touch pad 220 may be increased by about 1° C. from a reference temperature (e.g., the reference temperature being about 27° C. when the outdoor air temperature is about −1° C.). Since the above table representing change in the outdoor air temperature and change in the temperature of the touch pad 220 is only exemplary, the set temperature values may be adjusted through a screen menu according to a user selection and be changed into other values.

The controller 110 may be configured to output a notification to a driver regarding a heating process of the dial unit 200 by displaying light emitted from the LEDs 141 to 147 in different colors based on the surface temperatures of the touch pad 220. For example, when the touch pad 220 is heated (e.g., in a temperature increase mode), light emitted from the LEDs 141 to 147 may be changed from a color (e.g., blue) in the general lighting mode of the central control panel 100 to a yellowish color.

Figure 7A:
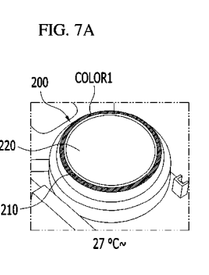
FIGS. 7A-7C are views illustrating operation of a lighting unit, illustrating temperature change when the central control panel is heated in accordance with one exemplary embodiment of the present invention.
Figure 7B:
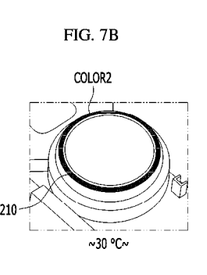
Figure 7C:
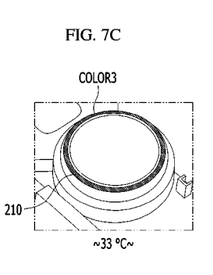

FIGS. 7A-7C are views illustrating operation of the lighting unit, illustrating temperature change when the central control panel is heated. As exemplarily shown in FIGS. 7A-7C, illustrating the dial unit 200 when the surface temperature of the touch pad 220 is −27° C., 30° C. and 33° C., the LEDs 141 to 147 may be configured to emit light in different colors whenever the surface temperature of the dial surface cover of the central control panel 100, i.e., the touch pad 220, is changed.

For example, in the temperature rising mode, the LEDs 141 to 147 may be configured to emit light of a specific color (e.g., yellow) along the top ring 210 such that saturation of the color is changed, thereby visually indicating temperature change. The LEDs 141 to 147 in the general lighting mode or in the temperature increase mode is not limited to the above description and may be modified to emit light of various colors and color saturations.

As described above, in this exemplary embodiment, the touch pad 220 may be heated through a method of heating the lighting unit 140 by changing a duty cycle of a PWM signal through the controller 110 and, thus, sufficient heating effects may be acquired without a separate heating wire, etc.

Figure 8:
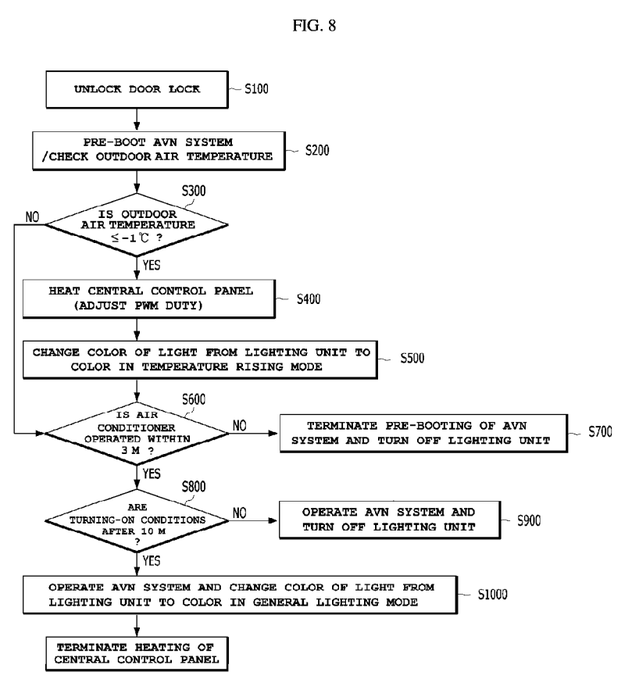
FIG. 8 is a flowchart illustrating a method of controlling a central control panel in accordance with one exemplary embodiment of the present invention.

FIG. 8 is a flowchart illustrating a method of controlling a central control panel in accordance with one exemplary embodiment of the present invention. With reference to the above-described figures together with this figure, the method will be described and the method may be executed by an overall controller within the vehicle. As exemplarily shown in FIG. 8, first, a door lock of a vehicle may be unlocked (Operation S100) (e.g., a door unlock signal may be received by the controller). When a driver unlocks the door lock (Operation S100), the body control module 30 may be configured to perform pre-booting of the AVN system 20 in connection with operation of the door latch 60 (Operation S200). In other words, when a vehicle door is opened, electronic systems connected to a vehicle network may be woken up and the AVN system 20 may start pre-booting.

During pre-booting of the AVN system 20 (Operation S200), an outdoor air temperature may be measured using the outdoor air temperature sensor 40. In particular, the measured outdoor air temperature information may be transmitted to the AVN system 20. Thereafter, whether the measured outdoor air temperature is a designated temperature or less may be determined (Operation S300). For example, the designated temperature may be about −1° C. In Operation S300, in response to determining that the measured outdoor air temperature is the designated temperature or less, the controller may be configured to determine that heating of the central control panel 100 is required.

Additionally, in response to determining that the measured outdoor air temperature is the designated temperature or less in Operation S300, the temperature of the touch pad 220 may be increased by changing the temperature of the lighting unit 140 of the central control panel 100 by providing a pulse width modulation (PWM) driving signal to the LEDs 141 to 147 of the central control panel 100 and adjusting a duty cycle of the PWM driving signal (Operation S400). In particular, the duty cycle of the PWM driving signal may be adjusted to increase the surface temperature of the touch pad 220 by about 1° C. from a reference temperature whenever the outdoor air temperature is decreased by about −1° C.

Thereafter, the temperature increase mode in which temperature change of the touch pad 220 is indicated as change in color of light from the lighting unit 140 may be performed (Operation S500). When the temperature of the lighting unit 140 is increased, light from the lighting unit 140 may be changed from a basic color to a color that indicates an increase in the temperature of the lighting unit 140. For example, in the temperature increase mode, the LEDs 141 to 147 may be configured to emit light in a specific color (e.g., yellow) along the top ring 210 such that saturation of the color is changed, thereby visually indicating temperature change.

After the temperature rising mode is performed (Operation S500), whether the air conditioner 10 is operated within about 3 minutes, for which pre-booting of the AVN system 20 is performed, may be determined (Operation S600). When a driver does not start an engine of the vehicle or does not operate the air conditioner 10 within 3 minutes, for which pre-booting of the AVN system 20 is performed, adjustment of the temperature of the touch pad 220 may be stopped to save power of a vehicle battery (e.g., the power supply unit 120). In other words, when the air conditioner 10 is not operated within 3 minutes, for which pre-booting of the AVN system 20 is performed, the AVN system 20 may be configured to terminate pre-booting and the lighting unit 140 of the central control panel 100 may be turned off (Operation S700).

Further, in Operation S600, when the air conditioner 10 is operated within about 3 minutes, for which pre-booting of the AVN system 20 is performed, turning-on conditions of the lighting unit 140 may be determined after a designated period of time (Operation S800). Particularly, the designated time may be about 10 minutes, and heating of the lighting unit 140 may be stopped after the specific period of time (e.g., after about 10 minutes has elapsed).

As a result of determining the turning-on conditions of the lighting unit 140, when turning-on of the lighting unit 140 is necessary, the color of light from the lighting unit 140 may be changed to a basic color (e.g., from yellow to blue) (Operation S1000). As the result of determining the turning-on conditions of the lighting unit 140, when turning-on of the lighting unit 140 is unnecessary, the lighting unit 140 may be turned off and the AVN system 20 may be normally operated (Operation S900).

As is apparent from the above description, in a central control panel for vehicles and a method of controlling the same in accordance with the present invention, a surface temperature of the central control panel may be increased by adjusting a PWM duty cycle of LEDs located under the surface of the central control panel based on an outdoor air temperature, and thus an AVN system may be operated more conveniently. Further, a color of light from the LEDs may be changed according to the temperature increase of the central control panel and thus, a driver may visually recognize change in the surface temperature of the central control panel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A central control panel for vehicles, comprising:
   a touch pad;
   a printed circuit board (PCB) disposed under the touch pad;
   a lighting unit mounted on the PCB and having a plurality of light emitting diodes (LEDs);
   an outdoor air temperature sensor configured to sense an outdoor air temperature of a vehicle; and
   a controller configured to adjust a temperature of the touch pad by changing a temperature of the lighting unit based on the sensed outdoor air temperature.

2. The central control panel for vehicles according to claim 1, wherein the controller is configured to adjust the temperature of the touch pad by changing the temperature of the lighting unit by providing a pulse width modulation (PWM) driving signal to the LEDs and adjusting a duty cycle of the PWM driving signal.

3. The central control panel for vehicles according to claim 2, further comprising:
   a top ring configured to transmit light emitted from the LEDs to the outside and to surround a perimeter of the touch pad.

4. The central control panel for vehicles according to claim 3, wherein the LEDs are spaced apart from each other along an outer circumference of the PCB.

5. The central control panel for vehicles according to claim 4, wherein the controller is configured to operate the LEDs to emit light in different colors based on surface temperatures of the touch pad.

6. The central control panel for vehicles according to claim 5, wherein the controller is configured to operate the LEDs to emit light in different colors between a general lighting mode and in a temperature increase mode.

7. The central control panel for vehicles according to claim 6, further comprising:
   a power supply unit configured to supply power to the lighting unit; and
   a switch unit installed between the controller and the lighting unit,
   wherein the switch unit is configured to adjust an intensity of current supplied to the lighting unit or a light emitting time of the LEDs based on a control signal from the controller.

8. The central control panel for vehicles according to claim 7, wherein the controller is configured to adjust the temperature of the touch pad according to a change in the outdoor air temperature of the vehicle during pre-booting of an audio video navigation (AVN) system in the vehicle.

9. The central control panel for vehicles according to claim 8, wherein the controller is configured to adjust the duty cycle of the PWM driving signal to increase the surface temperature of the touch pad by about 1° C. from a reference temperature when the outdoor air temperature is decreased by about −1° C.

10. The central control panel for vehicles according to claim 9, wherein adjustment of the temperature of the touch pad is performed for about 3 minutes, for which pre-booting of the AVN system is performed, and, when an engine of the vehicle is not started or the air conditioner is not operated within 3 minutes, for which pre-booting of the AVN system is performed, adjustment of the temperature of the touch pad is stopped.

11. The central control panel for vehicles according to claim 10, wherein, when the air conditioner is operated within 3 minutes, for which pre-booting of the AVN system is performed, adjustment of the temperature of the touch pad is performed for about 10 minutes.

\* \* \* \* \*